US012099619B2

(12) United States Patent
Ojha et al.

(10) Patent No.: US 12,099,619 B2
(45) Date of Patent: Sep. 24, 2024

(54) RANSOMWARE REMEDIATION IN COLLABORATION ENVIRONMENTS

(71) Applicant: Box, Inc., Redwood City, CA (US)

(72) Inventors: Alok Ojha, Newark, CA (US); Advait D. Karande, Foster City, CA (US); Peter Loer, Berkeley, CA (US); Jeremy Scott Spiegel, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 369 days.

(21) Appl. No.: 16/248,641

(22) Filed: Jan. 15, 2019

(65) Prior Publication Data
US 2020/0067975 A1 Feb. 27, 2020

Related U.S. Application Data

(60) Provisional application No. 62/723,314, filed on Aug. 27, 2018.

(51) Int. Cl.
*G06F 21/62* (2013.01)
*G06F 16/11* (2019.01)
(Continued)

(52) U.S. Cl.
CPC .......... *G06F 21/6218* (2013.01); *G06F 16/11* (2019.01); *G06F 21/53* (2013.01);
(Continued)

(58) Field of Classification Search
CPC ............... G06F 21/6218; G06F 21/577; G06F 21/6227; G06F 16/11; G06F 21/53;
(Continued)

(56) References Cited

U.S. PATENT DOCUMENTS 10,009,360 B1 * 6/2018 Todd ................... H04L 63/1416
10,055,582 B1 * 8/2018 Weaver ............... H04L 63/1416
(Continued)

OTHER PUBLICATIONS

"Magic numbers (programming)", Wikipedia, URL:https://en.wikipedia.org/wiki/Magic_number_(programming), Oct. 15, 2018.
(Continued)

*Primary Examiner* — Oleg Korsak
(74) *Attorney, Agent, or Firm* — Vista IP Law Group, LLP

(57) ABSTRACT

Systems and methods for ransomware protection in collaboration systems. One embodiment operates in conjunction with a collaboration system that manages one or more user devices that store device-local copies of content objects in storage areas of the one or more user devices. The collaboration system is accessed by the one or more user devices to facilitate collaboration activity over the content objects. Patterns of collaboration activity are classified, and in some cases, such patterns are deemed to be indicative of ransomware. If ransomware is indicated to be running on a user device, the collaboration system is notified that a ransomware process has been detected on the user device. The collaboration system delivers a prevention policy to other user devices that interface with the collaboration system. The prevention policy is in turn enforced by the other user devices to prevent synchronization of content object changes made by the ransomware.

20 Claims, 7 Drawing Sheets

(51) Int. Cl.
*G06F 21/53* (2013.01)
*G06F 21/57* (2013.01)
*G06N 5/04* (2023.01)
*G06N 20/00* (2019.01)
*H04L 9/40* (2022.01)
*H04L 67/06* (2022.01)
*H04L 67/55* (2022.01)

(52) U.S. Cl.
CPC ........ *G06F 21/577* (2013.01); *G06F 21/6227* (2013.01); *G06N 5/04* (2013.01); *G06N 20/00* (2019.01); *H04L 63/102* (2013.01); *H04L 63/105* (2013.01); *H04L 63/107* (2013.01); *H04L 63/1416* (2013.01); *H04L 63/1466* (2013.01); *H04L 67/06* (2013.01); *H04L 67/55* (2022.05); *G06F 2221/034* (2013.01)

(58) Field of Classification Search
CPC .... G06F 2221/034; G06N 20/00; G06N 5/04; G06N 5/022; G06N 5/046; H04L 63/102; H04L 63/107; H04L 63/1416; H04L 63/1466; H04L 67/06; H04L 67/26; H04L 63/105; H04L 63/104; H04L 67/22; H04L 67/55; G06Q 10/101; G06Q 50/01
See application file for complete search history.

(56) References Cited

U.S. PATENT DOCUMENTS

| | | | | |
|---|---|---|---|---|
| 10,169,586 | B2* | 1/2019 | Maciejak | G06F 21/566 |
| 10,229,269 | B1* | 3/2019 | Patton | G06F 21/554 |
| 10,601,853 | B2* | 3/2020 | Chesla | H04L 63/1433 |
| 10,609,066 | B1* | 3/2020 | Nossik | H04L 63/1408 |
| 10,706,167 | B1* | 7/2020 | Sokolov | H04L 63/20 |
| 10,860,730 | B1* | 12/2020 | Weaver | G06F 21/6218 |
| 10,893,068 | B1* | 1/2021 | Khalid | G06F 11/3409 |
| 11,120,131 | B2* | 9/2021 | Chen | G06F 11/1458 |
| 11,200,320 | B2* | 12/2021 | Chelarescu | H04L 63/14 |
| 2004/0205419 | A1* | 10/2004 | Liang | H04L 63/1408 714/57 |
| 2007/0255723 | A1* | 11/2007 | Jung | H04L 63/1408 |
| 2008/0104699 | A1* | 5/2008 | Gounares | G06F 9/468 726/22 |
| 2009/0282483 | A1* | 11/2009 | Bennett | H04L 63/1408 726/23 |
| 2009/0328220 | A1* | 12/2009 | Abdel-Aziz | G06F 21/552 726/24 |
| 2014/0026182 | A1* | 1/2014 | Pearl | H04L 63/20 726/1 |
| 2015/0172311 | A1* | 6/2015 | Freedman | H04L 63/1441 726/1 |
| 2016/0337316 | A1* | 11/2016 | Yan | H04L 63/1416 |
| 2017/0034189 | A1* | 2/2017 | Powell | H04L 63/1425 |
| 2017/0063930 | A1* | 3/2017 | Chesla | H04L 63/1425 |
| 2018/0007069 | A1* | 1/2018 | Hunt | G06F 21/566 |
| 2018/0034835 | A1* | 2/2018 | Iwanir | H04L 63/1416 |
| 2018/0048657 | A1* | 2/2018 | Hittel | G06F 21/552 |
| 2018/0048658 | A1* | 2/2018 | Hittel | G06F 21/552 |
| 2018/0054480 | A1* | 2/2018 | Bailey | H04L 67/42 |
| 2018/0063199 | A1* | 3/2018 | Lara | H04L 63/1458 |
| 2018/0075234 | A1* | 3/2018 | Boutnaru | G06F 21/554 |
| 2018/0075239 | A1* | 3/2018 | Boutnaru | G06F 21/60 |
| 2018/0121650 | A1* | 5/2018 | Brown | G06F 21/561 |
| 2018/0189490 | A1* | 7/2018 | Maciejak | G06F 21/566 |
| 2018/0211039 | A1* | 7/2018 | Tamir | G06F 21/568 |
| 2018/0212987 | A1* | 7/2018 | Tamir | H04L 63/1425 |
| 2018/0278647 | A1* | 9/2018 | Gabaev | H04L 63/1466 |
| 2018/0288087 | A1* | 10/2018 | Hittel | G06F 21/577 |
| 2018/0357133 | A1* | 12/2018 | Strogov | G06F 21/80 |
| 2019/0087572 | A1* | 3/2019 | Ellam | G06F 21/561 |
| 2019/0236274 | A1* | 8/2019 | Brenner | G06F 21/6245 |
| 2019/0303572 | A1* | 10/2019 | Chelarescu | G06F 11/1469 |
| 2019/0303573 | A1* | 10/2019 | Chelarescu | H04L 63/1416 |
| 2019/0303575 | A1* | 10/2019 | Chelarescu | G06F 21/561 |
| 2019/0306179 | A1* | 10/2019 | Chelarescu | H04L 63/14 |
| 2019/0319987 | A1* | 10/2019 | Levy | G06N 5/046 |
| 2020/0034537 | A1* | 1/2020 | Chen | G06F 16/951 |
| 2020/0279043 | A1* | 9/2020 | Thornton | G06N 5/022 |
| 2021/0152595 | A1* | 5/2021 | Hansen | G06F 21/568 |

OTHER PUBLICATIONS

"Malware", Wikipedia, URL:https://en.wikipedia.org/wiki/Malware, Oct. 8, 2018.

Mark Hachman, "Microsoft adds ransomware protections to make OneDrive and Outlook.com safer", PCWorld.com, URL:https://www.pcworld.com/article/3268016/microsoft-adds-ransomware-protections-to-onedrive-and-outlookcom.html, Apr. 5, 2018.

"Ransomware", Wikipedia, URL:https://en.wikipedia.org/wiki/Ransomware, Oct. 4, 2018.

* cited by examiner

RANSOMWARE REMEDIATION IN COLLABORATION ENVIRONMENTS

RELATED APPLICATIONS

The present application claims the benefit of priority to U.S. patent application Ser. No. 62/723,314 titled "COLLABORATION SYSTEM SECURITY", filed on Aug. 27, 2018, which is hereby incorporated by reference in its entirety.

FIELD

This disclosure relates to collaboration systems, and more particularly to techniques for ransomware remediation in collaboration environments.

BACKGROUND

As computing systems have evolved, so have the various forms of malicious software or "malware" that cause damage to the computing systems and/or wreak havoc for its users. Such malware (e.g., executable code, scripts, etc.) often gains access to a target computing system or computing device under the guise of a seemingly harmless action or set of actions performed at the computing device. For example, malware might be attached to a file downloaded by a particular user to a user's device. In this case, the malware will affect not only the user device of this particular user but also the user devices of any other users that download the shared file. Many of the earliest instances of malware were created as experiments or pranks. Today, however, malware is used by both individual hackers and even governments to steal personal, financial, and/or business information, and/or for other malicious purposes.

In some cases, malware might be developed to extort a content owner or user by threatening to publish the content or perpetually block access to the content unless a ransom is paid. Such malware is called "ransomware". Ransomware that is used to block access to certain content objects will often encrypt the content objects to make them temporarily inaccessible to the user—but allow them to be recovered (e.g., by decryption) at the command of the extortioner (e.g., after the ransom has been paid). Ransomware has evolved to also overwrite (e.g., with random content) any other copies of a content object that are stored on various storage mediums (e.g., hard disk drives (HDDs), solid-state drives (SSDs), etc.) in an attempt to prevent circumvention of the extortion.

Various methods to avoid paying the ransom have been attempted, however such methods have unwanted consequences (e.g., in lost productivity) that might be worse than paying the ransom. Such attempted methods include restoring the affected content from earlier stored versions of the content. In this case, edits to the content object performed after the restored earlier version will be lost. In cases where a previously stored copy of the affected content cannot be identified (e.g., the file identity is obfuscated by the extortioner), a roll back to some earlier-in-time recovery point can be performed. Such rollbacks have the potential expense of lost edits over a great deal of content, and possibly over a long period of time (e.g., when the date of the selected recovery point is old).

In collaboration systems that manage large volumes of content shared by many users at their user devices, there is a significant potential that ransomware and/or the effects of ransomware will propagate over the user devices. Specifically, any or all of a potentially large number of user devices of users of a collaboration system are not only susceptible to infection by ransomware, but the ransomware and/or ransomware effects might be propagated by the collaboration activity (e.g., content object sharing) at the collaboration system.

Unfortunately, the automatic propagation of shared content that occurs in collaboration systems introduces various complications to managing the deleterious effects of ransomware. Specifically, in collaboration systems, the unwanted effects of ransomware can be proportional to the number of users, the number of user devices, the number of content objects, the level and extent of collaboration activity, and/or other aspects associated with the collaboration system. As one example, if a folder comprising one hundred design documents that are shared by five hundred engineers is affected by ransomware, a substantial amount of computing resources and human effort would need to be expended to remediate the ransomware effects from the five hundred user devices, restore useful versions of the one hundred design documents, and reproduce any lost edits to the documents. What is needed is a way to eliminate or reduce the propagation of ransomware effects in collaboration systems.

SUMMARY

The present disclosure describes techniques used in systems, methods, and in computer program products for ransomware remediation in collaboration environments, which techniques advance the relevant technologies to address technological issues with legacy approaches. More specifically, the present disclosure describes techniques used in systems, methods, and in computer program products for remediation of ransomware effects across networks of devices in a collaboration environment. Certain embodiments are directed to technological solutions for dynamically generating and broadcasting prevention policies that identify and block ransomware propagation in a collaboration environment.

The disclosed embodiments modify and improve over legacy approaches. In particular, the herein-disclosed techniques provide technical solutions that address the technical problems attendant to propagation of deleterious ransomware effects in collaboration environments.

The ordered combination of steps of the embodiments serve in the context of practical applications that perform steps for dynamically generating and broadcasting prevention policies that identify and block ransomware propagation in a collaboration environment. The disclosed techniques for dynamically generating and broadcasting prevention policies that identify and block ransomware propagation in a collaboration environment overcome long-standing yet unsolved technological problems associated with propagation of ransomware in computerized collaboration systems.

Aspects of the present disclosure achieve performance and other improvements in peripheral technical fields including (but not limited to) virus detection and distributed storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
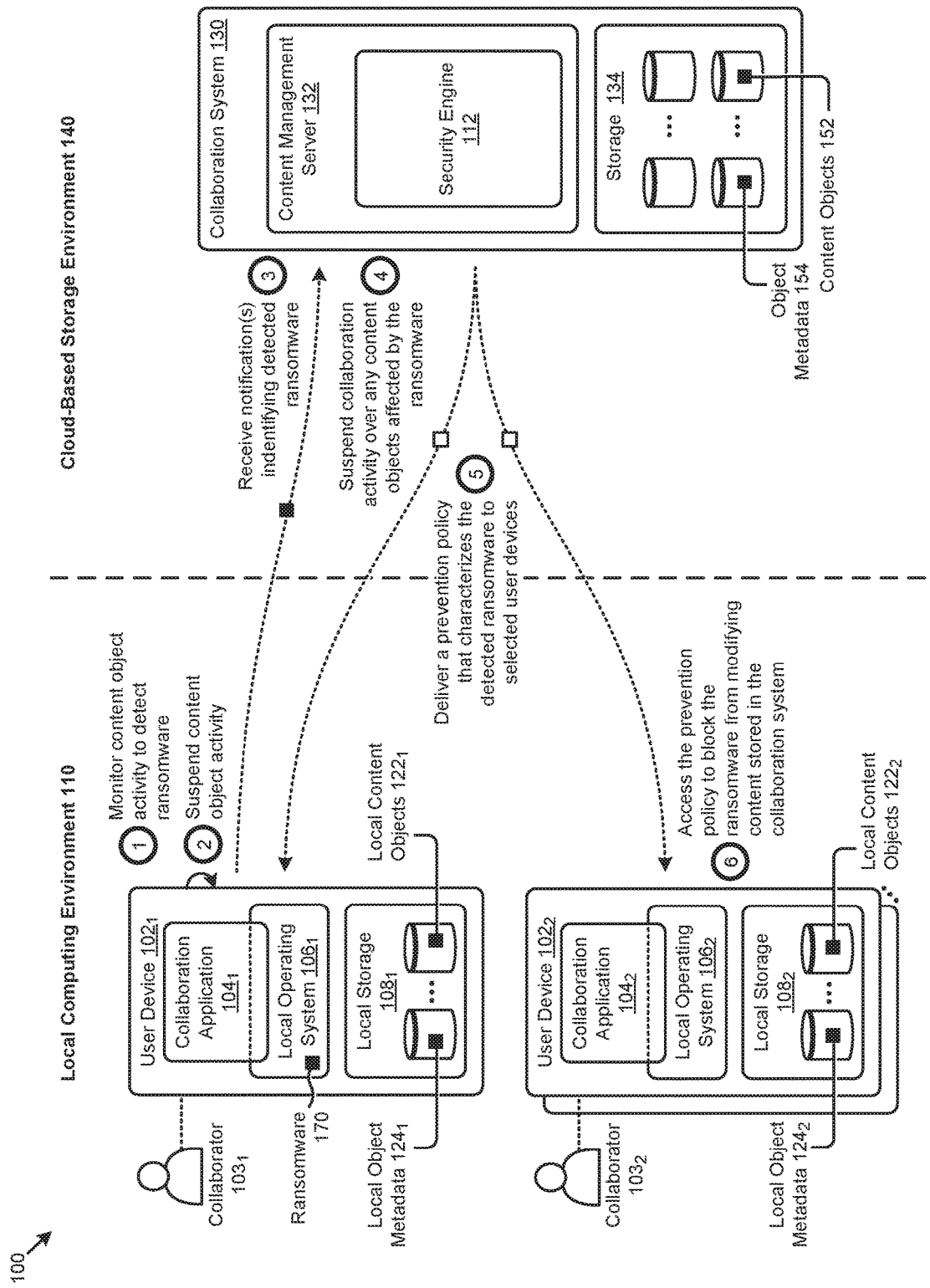
FIG. 1 illustrates a collaborative computing environment in which embodiments of the present disclosure can be implemented.

Aspects of the present disclosure may solve problems associated with using computer systems for avoiding propagation of deleterious ransomware effects in a collaboration system. Some embodiments are directed to approaches for dynamically generating and broadcasting prevention policies that identify and block ransomware propagation in a collaboration system. The accompanying figures and discussions herein present example environments, systems, methods, and computer program products for remediation of ransomware effects across networks of devices in collaboration systems.

Overview

Disclosed herein are techniques for dynamically generating and broadcasting prevention policies that identify and block ransomware propagation in collaboration environments. In certain embodiments, a collaboration system that manages a plurality of content objects accessed by users at respective user devices is identified. The various content objects and any collaboration activity performed over the content objects at each user device is monitored to detect the presence of ransomware. If ransomware is detected at a particular user device, a notification is issued to the collaboration system. The notification, for example, might include a ransomware process identifier, a user device identifier, a user identifier, and/or object identifiers of any content objects affected by or associated with the ransomware. As used herein, a ransomware process is any processing entity such as an application, job, task, or thread that maliciously modifies file or object content in a reversible manner such that (1) the file or object is rendered unusable for its originally intended purpose, and (2) the contents of the file or object can be restored to its state prior to the malicious modification.

Upon notification, collaboration activity over the identified content objects is suspended. A prevention policy is generated based at least in part on the notification information, and a prevention policy message comprising an instance of the prevention policy is pushed to the other user devices that have access to the content objects of the collaboration system.

The instances of the prevention policy at the user devices are accessed to, for example, block operations at the user devices that would invoke the ransomware that is identified in the policy. Suspending collaboration activities (e.g., file operations) over the identified content objects and blocking operations from identified ransomware processes serve to reduce the propagation of ransomware and/or ransomware effects throughout the collaboration system. In certain embodiments, various alerts are delivered to one or more of the users of the user devices. In certain embodiments, the prevention policies are accessed to prevent the propagation of ransomware and/or ransomware effects. In certain embodiments, the prevention policies are accessed to prevent the propagation of ransomware and/or ransomware effects in the native file system of the user devices.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a collaborative computing environment 100 in which embodiments of the present disclosure can be implemented. As an option, one or more variations of collaborative computing environment 100 or any aspect thereof may be implemented in the context of the architecture and functionality of the embodiments described herein.

FIG. 1 illustrates example operations to dynamically generate and broadcast prevention policies that identify and block ransomware propagation in a collaboration environment. Specifically, the figure presents a logical depiction of how the herein disclosed techniques can be implemented in a collaboration environment that comprises a cloud-based storage environment and multiple instances of local computing environments. A set of high order operations are presented to illustrate how the herein disclosed techniques can be used in such collaboration environments to avoid and/or otherwise manage (e.g., control, minimize, etc.) propagation of deleterious ransomware effects in collaboration environments.

The logical depiction of FIG. 1 illustrates a cloud-based storage environment 140 and a local computing environment 110. Cloud-based storage environment 140 comprises a collaboration system 130 that facilitates collaboration over large volumes of shared content objects by a plurality of users (e.g., collaborators). As can be observed, collaboration system 130 can comprise one or more instances of a content management server 132 with access to storage 134 that stores instances of the shared content remotely from local computing environment 110.

As an example, a content object from a collection of content objects 152 might be stored at storage 134 and accessed by and/or collaborated over by one or more of the collaborators. More particularly, a collaborator $103_1$ might interact (e.g., create, view, edit, etc.) with a particular content object using a user device $102_1$ in local computing environment 110. A collaborator $103_2$ might also interact with the same content object at a user device $102_2$. One or more other collaborators might interact with the same content object and/or other content objects with their respective user devices within local computing environment 110 or within other local computing environments.

A set of object metadata 154 associated with content objects 152 might also be stored at storage 134. The object metadata 154 describes certain attributes associated with each of the content objects 152 such as a name (e.g., file name), an object identifier, a version identifier, a physical storage location, various access permissions, and/or other attributes. Content management server 132 uses the object metadata 154 and/or other information to manage collaboration activities performed by the collaborators over the content objects that comprise content objects 152. Specifically, for example, content management server 132 can manage concurrent access to instances of the content objects 152 by multiple collaborators (e.g., collaborator $103_1$, collaborator $103_2$, and/or other collaborators) and resolve editing and/or versioning conflicts that might arise from the concurrent access.

In the embodiment shown in FIG. 1, access to the content objects 152 by the collaborators is facilitated by instances of a collaboration application (e.g., collaboration application $104_1$, collaboration application $104_2$, etc.) that are installed on respective instances of user devices (e.g., user device $102_1$ of collaborator $103_1$, user device $102_2$ of collaborator $103_2$, etc.). As used herein, a collaboration application is a computer program (e.g., comprising executable code) designed to perform a group of coordinated functions, tasks, or activities for the benefit of a user. More specifically, a collaboration application is designed to facilitate certain file operations (e.g., creating, viewing, editing, sharing, etc.) over shared content objects by one or more collaborators. Instances of the executable code constituting the collaboration application might be delivered by collaboration system 130 for installation at one or more user devices (e.g., desktop computers, laptop computers, tablets, mobile phones, etc.) associated with one or more collaborators. Furthermore, the executable code constituting the collaboration application may be a browser with a browser plug-in to implement web-based interactions with cloud-based storage environment 140, or the executable code constituting the collaboration application may be a software application that includes one or more browser components (e.g., browser extensions) to implement all or portions of web-based interactions with cloud-based storage environment 140.

When collaborators invoke their respective collaboration applications to interact with content objects, the collaboration applications retrieve the content objects from storage 134 of collaboration system 130. The retrieved content objects are added to a collection of local content objects (e.g., local content objects $122_1$, local content objects $122_2$, etc.) that are stored in a set of local storage (e.g., local storage $108_1$, local storage $108_2$, etc.) at each user device (e.g., user device $102_1$, user device $102_2$, etc.). Certain object metadata associated with the shared content objects might also be received and stored in a set of local object metadata (e.g., local object metadata $124_1$, local object metadata $124_2$, etc.). In some cases, the content object and/or any associated object metadata may be retrieved from the local storage at the user devices rather than from the storage 134 of collaboration system 130.

By interacting with the collaboration applications at the user devices, collaborators can perform various collaboration activity over the local content objects at the user devices. For example, collaborator $103_1$ might preview and then later edit a particular content object. When collaborator $103_1$ saves the edits, the edited instance of the local content object in local storage $108_1$ is synchronized with a remote instance of the content object in storage 134 of collaboration system 130. Collaborator $103_2$ might then access the remote instance of the content object in storage 134 for viewing and/or editing at user device $102_2$. In the foregoing scenario, if an instance of ransomware 170 is present at user device $102_1$, then the collaboration activity (e.g., viewing, editing, synchronizing, etc.) over the content object at collaboration system 130, user device $102_1$, user device $102_2$, and/or other user devices may result in a propagation of ransomware 170 to other devices in the collaborative computing environment.

Specifically, ransomware 170 might comprise an executable process that performs certain operations, such as raising a ransom demand, and encrypting content objects so as to establish a credible threat of data loss. In this case, avoiding propagation of the executable process (e.g., the ransomware) and the encrypted content object (e.g., the ransomware effects) is highly desired. The extent of the propagation of ransomware 170 over collaborative computing environment 100 can be proportional to the number of collaborators, the number of user devices, the number of content objects, the level of collaboration activity, and/or other aspects associated with the collaboration environment.

The herein disclosed techniques can remediate the effects of ransomware in collaboration environments by dynamically generating and broadcasting prevention policies that identify and block ransomware propagation. As illustrated in FIG. 1, such techniques facilitate monitoring the various content objects and any collaboration activity performed over the content objects at each user device in the collaboration environment to detect the presence of ransomware (operation 1).

Specifically, the collaboration application at each user device might monitor the composition of content objects and/or the patterns of collaboration activity to determine if ransomware is present. If ransomware 170 is detected at a particular user device (e.g., user device $102_1$), further action over content objects is suspended (operation 2). Furthermore, when ransomware 170 is detected at a particular user device (e.g., user device $102_1$), a notification that identifies the detected ransomware is sent to the collaboration system 130 (operation 3). Operations taken by the collaboration system 130 in response to receipt of the notification are carried out so as to prevent malicious modification of content at the collaboration system. In some cases, the sent notification is received by a security engine 112 at collaboration system 130, and such a security engine 112 uses the information transmitted with the notification to suspend and/or back-out certain collaboration activity over any content objects that might be affected by ransomware 170 (operation 4).

For example, security engine 112 might prevent synchronization of updates to any server-resident instances of content objects that are identified in the notification as having been encrypted or otherwise maliciously modified by ransomware 170. A prevention policy that characterizes the detected ransomware is generated at security engine 112 and delivered (e.g., pushed as a prevention message) to selected user devices (e.g., user device $102_1$, user device $102_2$, etc.) (operation 5). The selected user devices might comprise any or all user devices that at least potentially have access to the affected content objects. In some cases, potential access to the affected content objects can be determined based on organizational boundaries (e.g., departments), and/or based on collaboration access controls, and/or networks of interrelated users and/or their respective user devices.

The prevention messages comprising instances of the prevention policy are processed, and actions are taken to block operations that might be invoked by the ransomware that is identified in the policy (operation 6). For example, the collaboration applications at the user devices can process the prevention policy so as to block encryption operations invoked by any ransomware processes (e.g., as specified in the policy) associated with ransomware 170. More specifically, collaboration application $104_1$ at user device $102_1$ and collaboration application $104_2$ at user device $102_2$ can listen to events at local operating system $106_1$ and local operating system $106_2$, respectively, to block operations over the local content objects and/or over the native file system of the user devices that might be invoked by processes associated with ransomware 170.

Suspending file operations over the identified content objects and blocking operations from identified ransomware processes serve to reduce the propagation of ransomware and/or ransomware effects in collaboration system 130 and associated user devices (e.g., user device $102_1$, user device $102_2$, etc.). The foregoing ransomware propagation remediation capabilities facilitated by the herein disclosed techniques result in improvements in computer functionality that serve to reduce the impact of ransomware, and thus also serve to reduce demand for computer processing power that might otherwise be needed for remediation of ransomware effects. More specifically, applications of the herein disclosed techniques reduce the consumption of computing, storage, and networking resources by eliminating ransomware cleanup workloads at numerous user devices, by eliminating ransomware data recovery workloads over numerous content objects, and by eliminating numerous hours or even days of editing and/or re-journaling workloads that would be needed to restore lost data.

Various techniques for remediating propagation of ransomware effects across collaboration environments is disclosed in further detail as follows.

Figure 2:
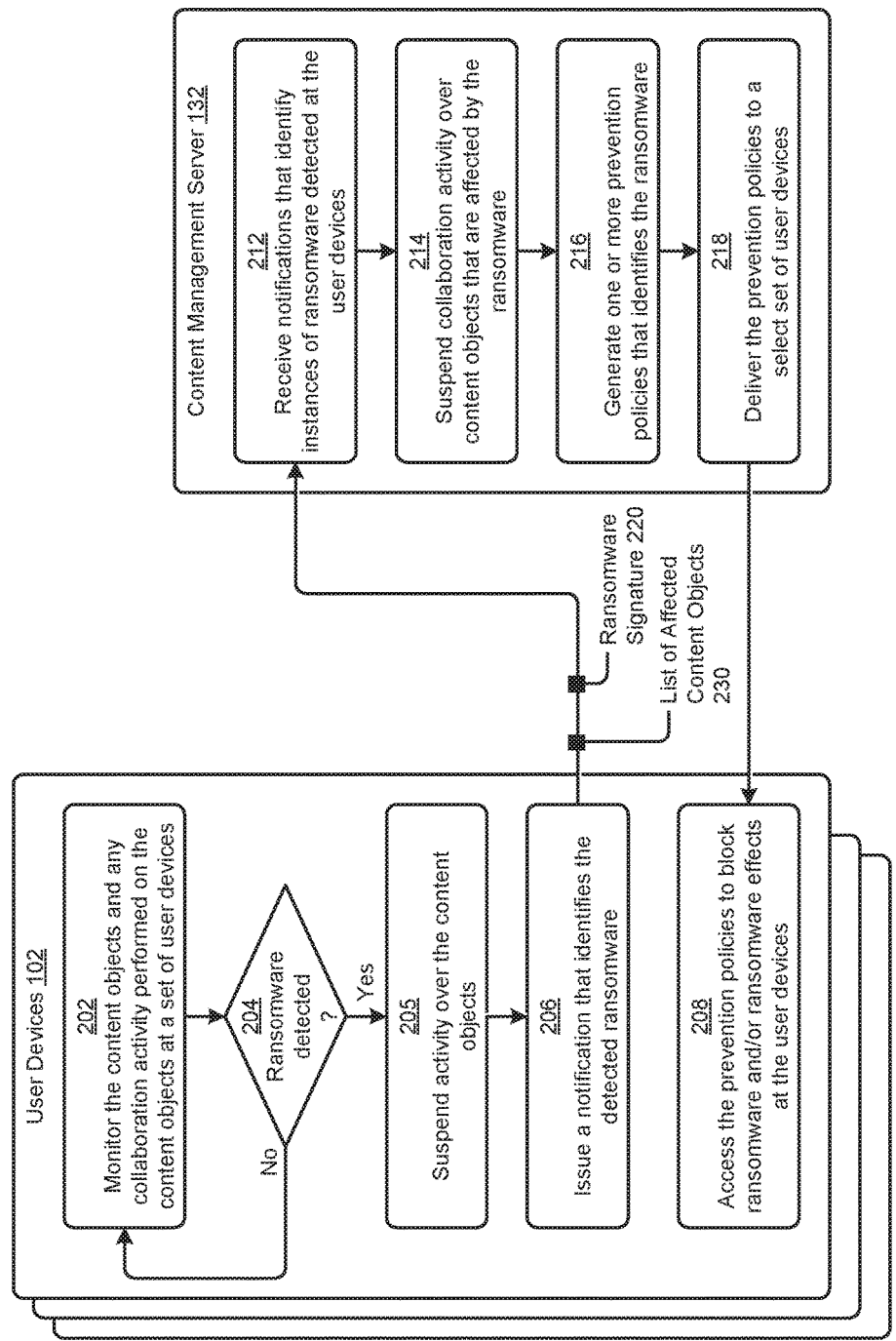
FIG. 2 depicts a ransomware remediation technique as implemented in systems that facilitate remediation of ransomware effects across networks of devices in a collaboration environment, according to an embodiment.

FIG. 2 depicts a ransomware remediation technique 200 as implemented in systems that facilitate remediation of ransomware effects across networks of devices in a collaboration environment. As an option, one or more variations of ransomware remediation technique 200 or any aspect thereof may be implemented in the context of the architecture and functionality of the embodiments described herein. The ransomware remediation technique 200 or any aspect thereof may be implemented in any environment.

FIG. 2 illustrates example operations to dynamically generate and broadcast prevention policies that identify and block ransomware propagation in a collaboration environment. Specifically, the figure is presented to illustrate one embodiment of certain steps and/or operations performed over a network of devices in a collaboration environment to remediate the propagation of ransomware effects across the environment. As can be observed, the steps and/or operations can be performed at one or more user devices 102 and/or at one or more instances of a content management server 132.

The ransomware remediation technique 200 can commence by monitoring the content objects and any collaboration activity performed over the content objects at a set of user devices (step 202). For example, a collaboration application at each of the user devices 102 might monitor the content objects and the collaboration activity at the user device to identify certain characteristics that might be indicative of the presence of ransomware at the device. If no ransomware is detected (see "No" path of decision 204), the monitoring continues at user devices 102. If ransomware is detected (see "Yes" path of decision 204), activity over the content objects is suspended (step 205). More specifically, communication with the content management server 132 is monitored at the user device so as to suppress sending synchronization messages. This is to avoid infecting collaboration objects that are stored at content management server 132.

In some cases, the user device might be offline. In such cases, in addition to suspending activity over the content objects, a priority message is formed and queued such that the priority message is sent to the content management server 132 when the device comes back online.

To form such a priority message, a ransomware signature (e.g., a process identifier) is generated, and a list of content objects that are deemed to have been affected by the ransomware is also generated. The list of affected content objects 230 and the ransomware signature 220 is delivered to the content management server 132 with high priority. Furthermore, if there are any pending messages that would initiate or otherwise cause changes to content objects stored at the content management server 132, then those pending messages are blocked from being sent to the content management server 132 as well.

As shown in this embodiment, the list of affected content objects 230 and the ransomware signature 220 is emitted (step 206) immediately after suspending activity over the content objects (step 205). Strictly as one example, such a notification might comprise the process hash of the executable process associated with the detected ransomware.

At content management server 132, notifications that identify instances of ransomware detected at various user devices (e.g., user devices 102) are received (step 212). In large, highly active collaboration environments, such notifications can be received from numerous user devices and be associated with numerous content objects. In response to receiving the notifications, certain collaboration activity over any content objects that have been or may have been affected by the ransomware identified in the notifications is suspended (step 214). As an example, updates to content objects identified in the received notifications as being impacted or being potentially impacted by ransomware might be suspended or at least queued for later user and/or system generated approvals or disapprovals.

One or more prevention policies that characterize the detected ransomware are generated (step 216). For example, a prevention policy might comprise information that describes a process hash associated with one or more instances of ransomware. In some embodiments, there are multiple policy types. One type of policy, namely a ransomware-specific policy corresponds to a particular ransomware signature. Such a ransomware-specific policy defines what actions are to be carried out when a particular, previously identified ransomware process is detected. Another type of policy, namely a ransomware-agnostic policy, serves to define what actions are to be carried out when any sort of ransomware is detected. Such policies of either type can be pre-cached on local user devices. Moreover, such policies can be delivered in a prevention message that carries payload in the form of one or more prevention policy objects. The prevention messages may be delivered via any known techniques for messaging between devices. In some cases, the prevention messages comprise an indication of a policy to enforce rather than a prevention policy object. As such, a prevention message can serve to instruct the recipient to enforce a particular policy that is identified by a policy identifier. Any of the foregoing techniques for delivering a prevention policy to a recipient can be operated singly, or in combination.

When a prevention message is processed by a recipient, acts taken by the recipient of the prevention message serve to prevent applying changes (i.e., maliciously generated changes) to content stored at content management server 132. Further, the one or more prevention messages are delivered to a select set of user devices that have access to content management server 132 (step 218). The user devices selected to receive the prevention message can be based at least in part on various criteria. Instructions in the prevention message and/or any one or more prevention policies indicated by the prevention message are acted upon by the user devices so as to block execution of ransomware and/or so as to block and/or remediate the effects of ransomware (step 208).

For example, various executable processes identified in the prevention policies as being associated with ransomware can be blocked at the operating systems of user devices 102 to prevent further propagation of the ransomware. In some cases, certain collaboration activity over various content objects identified in the prevention policies might be suspended. In some cases, I/O (input/output or I/O commands that pertain to local object metadata or local object content stored in a memory (e.g., cache memory) or in local storage of the user device are disabled. In some cases, all I/O commands that pertain to local storage of the user device are disabled. In some cases, the process that is deemed to be maliciously generating changes to the file system is disabled. In some cases, various content objects that have been created or modified by the ransomware are deleted or quarantined to a safe location (e.g., where they cannot be executed or accessed). In some cases, one or more content objects are generated by the ransomware itself. In some cases, the ransomware replicates itself either as a newly-generated content object (e.g., that is a clone of the ransomware), or as malware that is embedded into a new or existing content object.

One embodiment of a system, data flows, and data structures for implementing the ransomware remediation technique 200 and/or other herein disclosed techniques is disclosed as follows.

Figure 3:
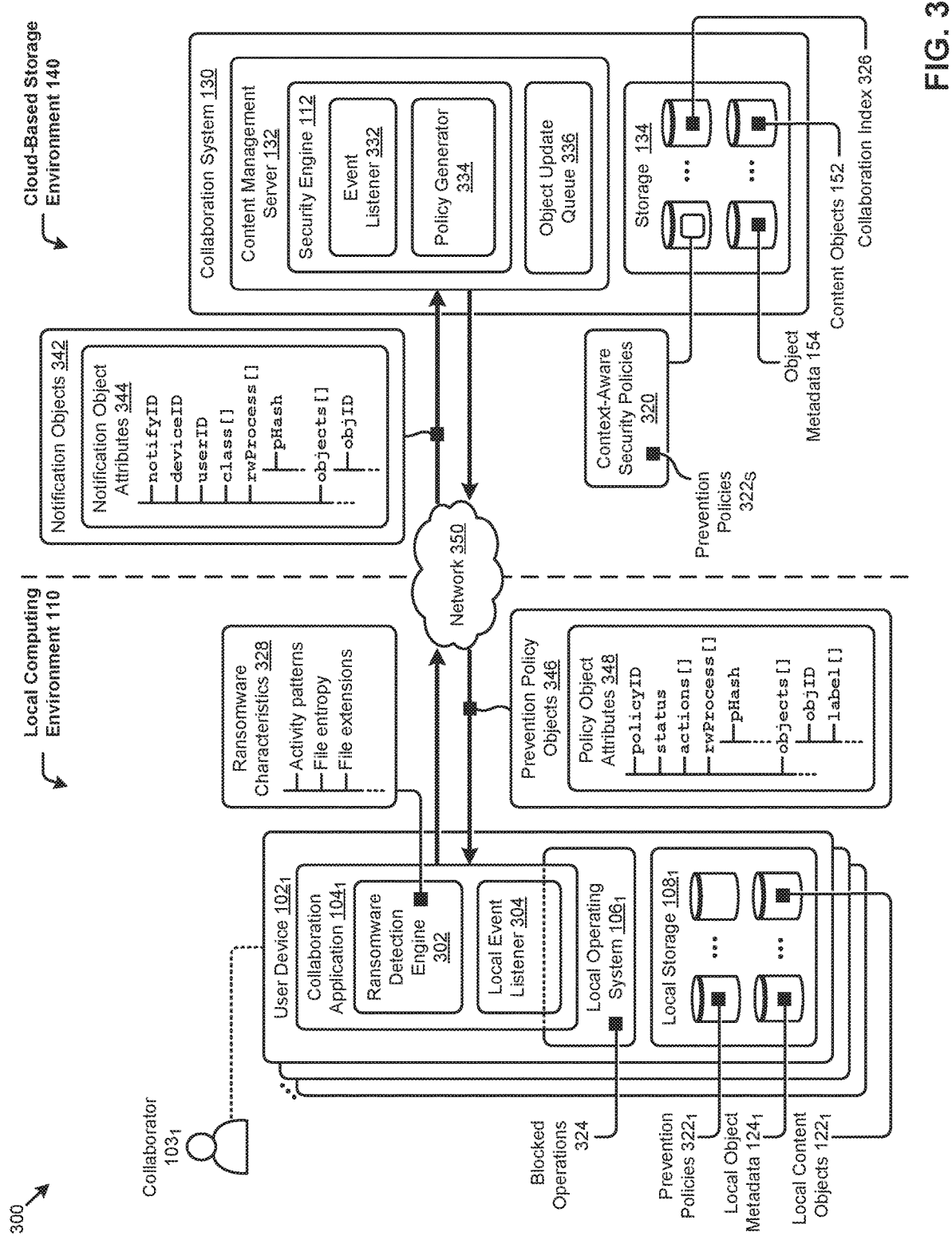
FIG. 3 is a block diagram of a system that implements remediation of ransomware effects across networks of devices in a collaboration environment, according to an embodiment.

FIG. 3 is a block diagram of a system 300 that implements remediation of ransomware effects across networks of devices in a collaboration environment. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to dynamically generating and broadcasting prevention policies that identify and block ransomware propagation in a collaboration environment. Specifically, the figure is being presented to show one embodiment of certain representative components and associated data flows that describes how the herein disclosed techniques might be implemented in a collaboration environment that comprises a cloud-based storage environment 140 and one or more instances of a local computing environment 110. Also illustrated are various specialized data structures that improve the way a computer uses data in memory and/or communicates with other computers when performing operations facilitated by the herein disclosed techniques at system 300. The components, data flows, and data structures shown in FIG. 3 present one partitioning and associated data manipulation approach. The specific example shown is purely exemplary, and other subsystems, data structures, and/or partitioning are reasonable.

As shown, system 300 comprises several components earlier described. Specifically shown are user device $102_1$ accessed by collaborator $103_1$ in local computing environment 110 and collaboration system 130 in cloud-based storage environment 140. User device $102_1$, collaborator $103_1$, and local computing environment 110 represent a plurality of user devices and corresponding collaborators and local computing environments that might be associated with a particular remote (e.g., cloud-based) content management system and storage environment. As earlier described, the collaboration system 130 comprises one or more instances of a content management server 132 that can access various instances of shared content objects (e.g., content objects 152) and associated object metadata (e.g., object metadata 154) stored in storage 134.

A collaboration index 326 is also stored in storage 134. Collaboration index 326 is accessed by content management server 132 and/or security engine 112 at content management server 132 to facilitate the herein disclosed techniques and/or other techniques implemented at collaboration system 130. A collaboration index, as used herein, is a set of data records that describe the relationships between users (e.g., collaborators), between content objects, and/or between users and content objects. For example, certain data in collaboration index 326 might identify (e.g., by a user identifier) all of the users in a particular collaboration group (e.g., the engineering department of an enterprise), or identify (e.g., by an object identifier) the content objects that a set of users have accessed or have been invited to access.

Furthermore, a set of context-aware security policies 320 that are managed and/or otherwise accessed by security engine 112 at content management server 132 are stored in storage 134. Such context-aware security policies, as used herein, are rule-based policies that produce on-demand content object collaboration permissions based at least in part on one or more context attributes. Such context attributes might be related to object-based contexts, location-based contexts, and/or security-based contexts. More specifically, context attributes might pertain to the object metadata (e.g., labels, tags, etc.) associated with a content object, the location of the user device requesting access to a content object, or the role of the user requesting access to a content object. The context attributes are applied to one or more rules associated with the policies to determine collaboration permissions and/or actions (e.g., allow, deny, suspend sync, preview only, add watermark, force re-authorization, etc.). In certain embodiments, the aforementioned prevention policies can be considered a type of context-aware security policy.

As further shown in system 300, an instance of a collaboration application $104_1$ (e.g., provided by collaboration system 130) is installed on user device $102_1$ to facilitate interactions with the content objects 152 by collaborator $103_1$. Various instances of local content objects $122_1$ and local object metadata $124_1$ that correspond to instances of content objects 152 and object metadata 154, respectively, are stored in the local storage $108_1$ of user device $102_1$. As can be observed, a ransomware detection engine 302 and a local event listener 304 are implemented in collaboration application $104_1$ and/or other instances of collaboration applications installed at other user devices in the collaboration environment.

As a representative scenario facilitated by the herein disclosed techniques, ransomware detection engine 302 at user device $102_1$ can monitor the local content objects $122_1$ and collaboration activity over the content objects to detect the presence of ransomware. As indicated in a set of ransomware characteristics 328, ransomware detection engine 302 might consider activity patterns, content object (e.g., file) composition entropy, content object file extensions, and/or other characteristics to detect the presence of ransomware. As a specific example, a sequence of fast open-edit-close file operations over multiple content objects might indicate the presence of ransomware. As another example, a specific set of file operations that open a new instance of a content object, read the current instance of an object, write encrypted content to the new instance, and write random data (e.g., nonsense, gibberish, etc.) to the current instance, might also indicate the presence of ransomware.

In some cases, ransomware might be operating when the data of an encrypted content object has a higher entropy (e.g., more random, non-uniform) than the data of a non-encrypted content object. As such, a content object's entropy can be used as an indicator of the presence of ransomware. In some cases, certain file extensions (e.g., a ".lock" file extension) might indicate the presence of ransomware. In some cases, comparison of a current version to a previous version can indicate malicious modification. For example, ransomware that encrypts a file might obliterate a magic number that was present in the just previous, unaltered version of the file or object. This obliteration can be deemed to be malicious, or at least destructive, and as such detection of such obliteration might be an indicator of ransomware activity. Moreover, the presence of, or detected obliteration of, magic number sequences can be used to exclude certain files from other checks, thus reducing computational load on the device.

Still further, patterns of execution of the processes running on a machine can be monitored over time. Whereas non-malicious processes might have a repeating historical pattern of usage (e.g., an email reader is launched once or twice each day) malicious processes or suspected malicious processes might not have such a history. As such, newly identified processes might be subjected to additional monitoring and/or might be subjected to additional analysis so as to identify malicious behavior upon detection of a first occurrence of any one of the aforementioned activity patterns.

Based at least in part on detection of any of the foregoing activity patterns, and/or based at least in part on any of the foregoing indicators, and/or based on any combination thereof, ransomware detection engine 302 might determine that ransomware is present at user device $102_1$. Any activities that are deemed to be malicious are suspended, and a notification is issued to alert the security engine 112 at collaboration system 130 that ransomware has been detected. Such notifications might be issued over a network 350 as messages that comprise one or more notification objects 342. Notification objects 342 are, for example, programming objects that comprise attributes that pertain to a specific issued notification. Each notification often pertains to a new discovery of an instance of ransomware at a particular user device.

The notification objects might be formatted (e.g., in JSON) and communicated over network 350 as the payload of an HTTP call to a receiving API at security engine 112. As indicated by a set of notification object attributes 344, each notification object might describe a notification identifier (e.g., stored in a "notifyID" field), a user device identifier (e.g., stored in a "device ID" field), a user (e.g., collaborator) identifier (e.g., stored in a "userID" field), a ransomware detection class (e.g., stored in a "class [ ]" object), a set of information characterizing the ransomware process or processes (e.g., stored in a "rwProcess [ ]" object), a list of content objects affected by the ransomware (e.g., stored in an "objects [ ]" object), and/or other information associated with the notification. The aforementioned ransomware detection class might correspond to the one or more ransomware characteristics (e.g., activity pattern, file entropy, file extension, etc.) that precipitated the notification. As shown, each executable process associated with the ransomware might also be described at least in part by a process checksum or hash (e.g., stored in a "pHash" field), and each of the list of content objects affected by the ransomware might be identified by an object identifier (e.g., stored in an "objID" field).

An event listener 332 receives one or more instances of notification objects 342 for processing at security engine 112. Notification objects 342 can be received asynchronously over network 350 from a network of devices (e.g., user device $102_1$). Event listener 332 presents the attributes of notification objects 342 to a policy generator 334 at security engine 112. At least one prevention policy is generated by policy generator 334 in response to receiving a particular notification object.

As used herein, a prevention policy is a context-aware security policy that references a rule base that is configured to limit or eliminate propagation of ransomware and/or ransomware effects. Context attributes are applied to the foregoing rules of the prevention policy to determine collaboration permissions and/or actions. For example, a request to access a content object identified in a prevention policy (e.g., as a content object affected by ransomware) might generate permissions that prevent access and/or allow merely a "view only" access. A prevention policy might also identify a process (e.g., as associated with ransomware) that is to be blocked in all circumstances, whether as related to content objects associated with a collaboration system or related to the local file system of a user device. The prevention policy generated by policy generator 334 is stored at storage 134 in a set of prevention policies $322_S$.

Security engine 112 continuously monitors the prevention policies $322_S$ to prevent the propagation of ransomware and/or ransomware effects at collaboration system 130. For example, any operations invoked by ransomware processes identified in prevention policies $322_S$ as being associated with ransomware will be blocked at content management server 132 by security engine 112. Furthermore, collaboration activity over certain content objects identified in prevention policies $322_S$ as being affected or potentially affected by ransomware will be controlled at content management server 132.

As an example, synchronization of the edits to a content object affected by ransomware that are received from the user devices of various collaborators might be suspended. Such collaboration activity suspensions might remain in effect at least until a certain ransomware remediation status (e.g., as determined by security engine 112) has been achieved. More specifically, security engine 112 might direct synchronization requests for an affected content object to an object update queue 336 at content management server 132 until the then-current set of prevention policies $322_S$ have been deployed to all appropriate user devices, as later discussed in more detail.

Management of the collaboration activity over certain content objects at collaboration system 130 and/or at instances of user devices can be facilitated by classification labels associated with the content objects. Such classification labels are attributes or objects stored in the object metadata (e.g., in object metadata 154, or in local object metadata $124_1$, etc.) that control how content objects are accessed and/or manipulated. Classification labels can be applied as inputs to instances of context-aware security policies 320 (e.g., prevention policies) to determine the respective collaboration permissions and/or actions allowed by the policies. For example, a content object identified as being associated with ransomware might have a classification label in its object metadata that indicates the ransomware association so as to suspend edits over the content object. When the collaboration activity suspension is lifted, the classification label can be removed or modified to indicate that editing is allowed. Classification labels are not only used for access or collaboration activity control, but also for facilitating context-rich alerts, collaboration activity tracking, classification-based collaboration insights, and/or other outcomes.

The instances of prevention policies $322_S$ generated at collaboration system 130 are delivered (e.g., pushed, broadcasted, etc.) over network 350 to one or more user devices to prevent propagation of ransomware at the devices. For example, certain instances of prevention policies $322_S$ might be delivered to user device $102_1$ and stored as prevention policies $322_1$ in local storage $108_1$. Collaboration index 326 might be accessed to select the user devices to receive the prevention policies. As one example, collaboration index 326 is consulted to identify the user devices of any collaborators with access to a particular content object that is determined to be associated with certain ransomware, and the prevention policy or policies associated with that ransomware is then delivered to the identified user devices. In other cases, a prevention policy might be considered a global policy and issued to any and all user devices that might have access to content objects 152 at collaboration system 130.

As can be observed, the instances of prevention policies $322_S$ are delivered to the selected user devices (e.g., user device $102_1$) in respective instances of prevention policy objects 346. Prevention policy objects 346 are programming objects that comprise attributes that pertain to a specific prevention policy. The prevention policy objects might be formatted (e.g., in JSON) and communicated over network 350 as the payload of an HTTP call to a receiving API at instances of a collaboration application. Specifically, local event listener 304 at collaboration application $104_1$ might receive instances of prevention policy objects 346 issued to user device $102_1$.

As indicated by a set of policy object attributes 348, each prevention policy object might describe a policy identifier (e.g., stored in a "policyID" field), a description of a ransomware remediation status for the ransomware associated with the policy (e.g., stored in a "status" field), a list of actions to carry out in accordance with the policy (e.g., stored in an "actions [ ]" object), a set of information characterizing the ransomware process or processes associated with the policy (e.g., stored in a "rwProcess [ ]" object), a list of content objects affected by the ransomware associated with the policy (e.g., stored in an "objects [ ]" object), and/or other information associated with the policy. As shown, each executable process corresponding to the ransomware associated with the policy might also be described at least in part by a process hash (e.g., stored in a "pHash" field). Furthermore, each of the list of content objects affected by the ransomware associated with the policy might be identified by an object identifier (e.g., stored in an "objID" field) and classified according to a classification label (e.g., stored in a "label [ ]" object).

The collaboration application at each user device continuously monitors local instances of prevention policies to prevent the propagation of ransomware and/or ransomware effects at the user device. For example, any operations invoked by processes identified in prevention policies $322_1$ as being associated with ransomware will be blocked at user device $102_1$ by collaboration application $104_1$. More specifically, the local event listener 304 will monitor the local operating system $106_1$ for such ransomware operations and block the operations (e.g., blocked operations 324) at local operating system $106_1$. Furthermore, collaboration activity over certain content objects identified in prevention policies $322_1$ as being affected or potentially affected by ransomware will be controlled at user device $102_1$. As an example, editing operations over a content object affected by ransomware might be suspended at user device $102_1$ by collaboration application $104_1$. Such collaboration activity suspensions might remain in effect at least until a certain ransomware remediation status (e.g., as determined by security engine 112) has been achieved. Ransomware remediation status changes can be communicated to user devices in the "status" field of prevention policy objects.

The foregoing discussions include techniques for replicating the foregoing changes to the embedded content object at a remotely-stored instance of the embedded content object for access by various collaborators, which techniques are disclosed in further detail as follows.

Figure 4:
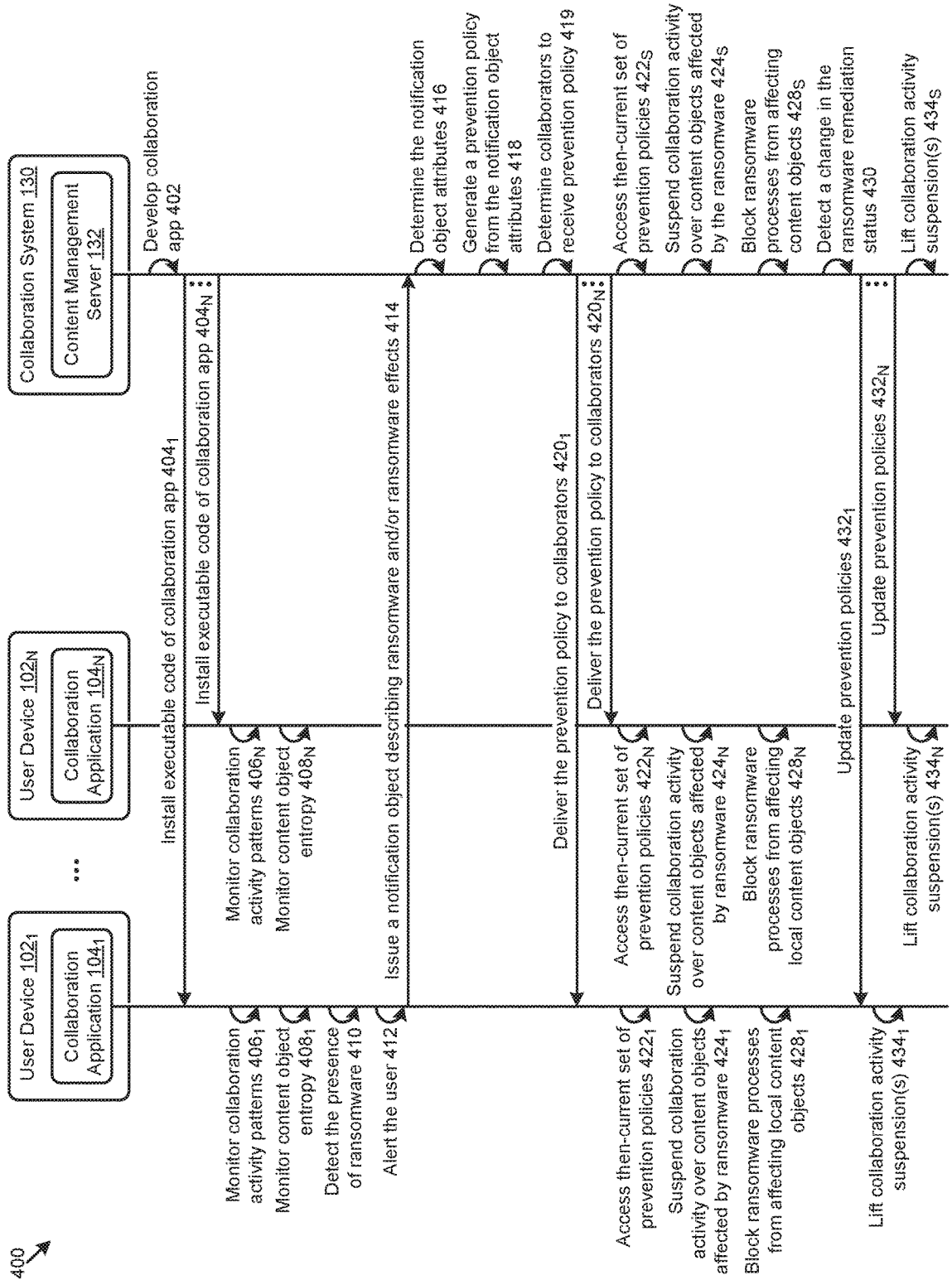
FIG. 4 exemplifies a policy-based ransomware propagation prevention scenario as implemented in systems that facilitate remediation of ransomware effects in a collaboration system, according to an embodiment.

FIG. 4 exemplifies a policy-based ransomware propagation prevention scenario 400 as implemented in systems that facilitate remediation of ransomware effects in a collaboration system. As an option, one or more variations of policy-based ransomware propagation prevention scenario 400 or any aspect thereof may be implemented in the context of the architecture and functionality of the embodiments described herein. The policy-based ransomware propagation prevention scenario 400 or any aspect thereof may be implemented in any environment.

FIG. 4 illustrates operational aspects pertaining to dynamically generating and broadcasting prevention policies that identify and block ransomware propagation in a collaboration environment. Specifically, the figure is being presented to illustrate a representative ransomware propagation remediation scenario performed over a network of devices (e.g., user devices, servers, etc.) associated with a collaboration environment. The scenario is described by high order interactions (e.g., operations, messages, etc.) exhibited by the various devices and associated computing components in the collaboration environment. The particular devices and computing components shown in FIG. 4 are (1) components of collaboration system 130 including one or more content management servers, and (2) user devices including respective collaboration applications. The shown second instance of a user device (i.e., user device $102_N$) is representative of a number (N) of collaborators that might be collaborating over shared content objects using collaboration application $104_N$ to access the shared content via collaboration system 130.

In this embodiment, the scenario commences upon developing (e.g., using a server at collaboration system 130) a set of executable code that constitutes a collaboration application ("collaboration app") as described herein (operation 402). The executable code is then installed at each of the user devices (message $404_1$ and message $404_N$). For example, a collaborator associated with a user device might use a browser to address an access point (e.g., via a uniform resource location (URL)) for requesting a download and installation of the collaboration application. In some embodiments, the capabilities of the collaboration application might be provided by a web application that is accessible by a browser at a user device such that a download of the executable code is not needed.

Such capabilities provided by the collaboration applications at the user devices (e.g., whether available as an installed application or a web application) facilitate monitoring of collaboration activity patterns (e.g., operation $406_1$ and operation $406_N$) and/or monitoring of content object composition entropy (e.g., operation $408_1$ and operation $408_N$) at the user devices. In some cases, the collaboration application uses file system interfaces (e.g., hooks or callbacks, etc.) to monitor which processes are making changes to the file system objects. In other cases, a monitoring layer or monitoring function is established within the collaboration applications and/or between the collaboration applications and the file system such that file system changes that are raised by any non-monitoring components of the collaboration applications can be isolated and analyzed. In exemplary embodiments, the monitoring layer is configured into a collaboration application that manages a local copy of a corresponding remote content object.

Further details regarding general approaches to managing local copies of corresponding remote content objects are described in U.S. patent application Ser. No. 15/140,179 titled "VIRTUAL FILE SYSTEM FOR CLOUD-BASED SHARED CONTENT", filed Apr. 27, 2016, which is hereby incorporated by reference in its entirety.

The information produced by the foregoing monitoring, and/or other information pertaining to activities or operations performed on the local copy or copies of corresponding remote content objects, is continuously analyzed to determine whether ransomware is present at the user device.

As shown in policy-based ransomware propagation prevention scenario 400, ransomware might be detected at user device $102_1$ (operation 410). In response to detecting the ransomware, one or more alert messages are presented to the user (e.g., collaborator) of user device $102_1$ (operation 412). The type and/or content of the alert message can depend on various characteristics related to the ransomware and/or how the ransomware was detected (e.g., the ransomware detection class). For example, an alert message that merely informs the collaborator that ransomware has been detected and that steps are being automatically taken to remediate propagation might be presented when there is a high confidence level that ransomware is present. An alert message that asks a collaborator to confirm or deny the legitimacy of a particular process might be presented when there is a lower confidence level that ransomware is present. Such confidence levels can be based at least in part on certain statistical confidence attributes (e.g., scores, intervals, etc.) associated with the ransomware detection methods and/or class.

When the presence of ransomware is detected and/or confirmed, a notification object that describes the ransomware and/or its effects is issued from collaboration application $104_1$ of user device $102_1$ to content management server 132 (message 414). Content management server 132 determines the notification object attributes from the notification object (operation 416) to generate a prevention policy associated with the detected ransomware (operation 418). The notification object attributes can also be used to determine the set of collaborators and/or user devices to receive the generated prevention policy (operation 419). As earlier mentioned, a collaboration index at collaboration system 130 might be consulted to identify the network of collaborators and/or user devices associated with user device $102_1$ and/or any content objects affected or potentially affected by the ransomware.

As illustrated, the prevention policy generated at content management server 132 is delivered to the user devices of the collaborators identified to receive the policy (message $420_1$ and message $420_N$). In policy-based ransomware propagation prevention scenario 400, user device $102_1$ and user device $102_N$ receive the prevention policy. As such, an instance of the prevention policy exists at collaboration system 130, user device $102_1$, and user device $102_N$.

Ransomware often mutates over time. As such, the collaboration system might determine new ways to detect the existence of ransomware. Such new ways might include determination of new activity patterns that serve to identify existence of ransomware. Such new activity patterns might then be broadcast to user devices. Further, the collaboration system might determine new file entropy parameters that can be used to detect the existence of ransomware. Still further, the collaboration system might determine new file types or file extensions that can be used to detect the existence of ransomware. Any or all of the foregoing activity patterns, and/or file entropy parameters, and/or file extensions might be broadcast as prevention messages comprising any number of detection techniques and/or prevention policies.

As shown, prevention policies can be accessed at the devices and servers in the collaboration environment (operation $422_1$, operation $422_N$, and operation $422_S$). In some cases, the semantics of a prevention policy causes the devices and servers to suspend certain collaboration activity over content objects affected by ransomware (operation $424_1$, operation $424_N$, and operation $424_S$) and block ransomware processes. In some cases, operations to block ransomware processes at the user device (e.g., to block ransomware processes from affecting local content objects) are facilitated by the operating systems of the user devices (operation $428_1$, operation $428_N$, and operation $428_S$). For example, file operations might be intercepted at the point of system calls made to the underlying operating system.

At some later moment in time, a change to the ransomware remediation status associated with the ransomware earlier detected at user device $102_1$ might be detected (operation 430). For example, a status change might occur in response to pushing the prevention policy to all targeted user devices and restoring all affected content objects to some non-encrypted version. For example, the collaboration server would revert the affected files either automatically, or in response to a go-ahead from an administrator. In some cases, user devices would revert to earlier versions of the affected files.

Some or all of the foregoing prevention policies describe actions to be taken when ransomware is detected. Once deployed to a device, such policies are added to a device-local database and would remain in effect into the future. The database of ransomware signatures and corresponding policies increase over time. As new ransomware signatures are seen at the collaboration server (e.g., as a result of detection at a user device), one or more policies that correspond to the particular ransomware are identified, and such identified policies are pushed to all user devices from the collaboration server.

Updates to one or more prevention policies that include the updated status can be issued to the user devices (message $432_1$ and message $432_N$). In response to receiving the updated prevention policies, earlier applied collaboration activity suspensions associated with the updated policies can be lifted (e.g., collaboration activity resumed) at all corresponding user devices and servers (operation $434_1$, operation $434_N$, and operation $434_S$).

ADDITIONAL EMBODIMENTS OF THE DISCLOSURE

Additional Practical Application Examples

Figure 5:
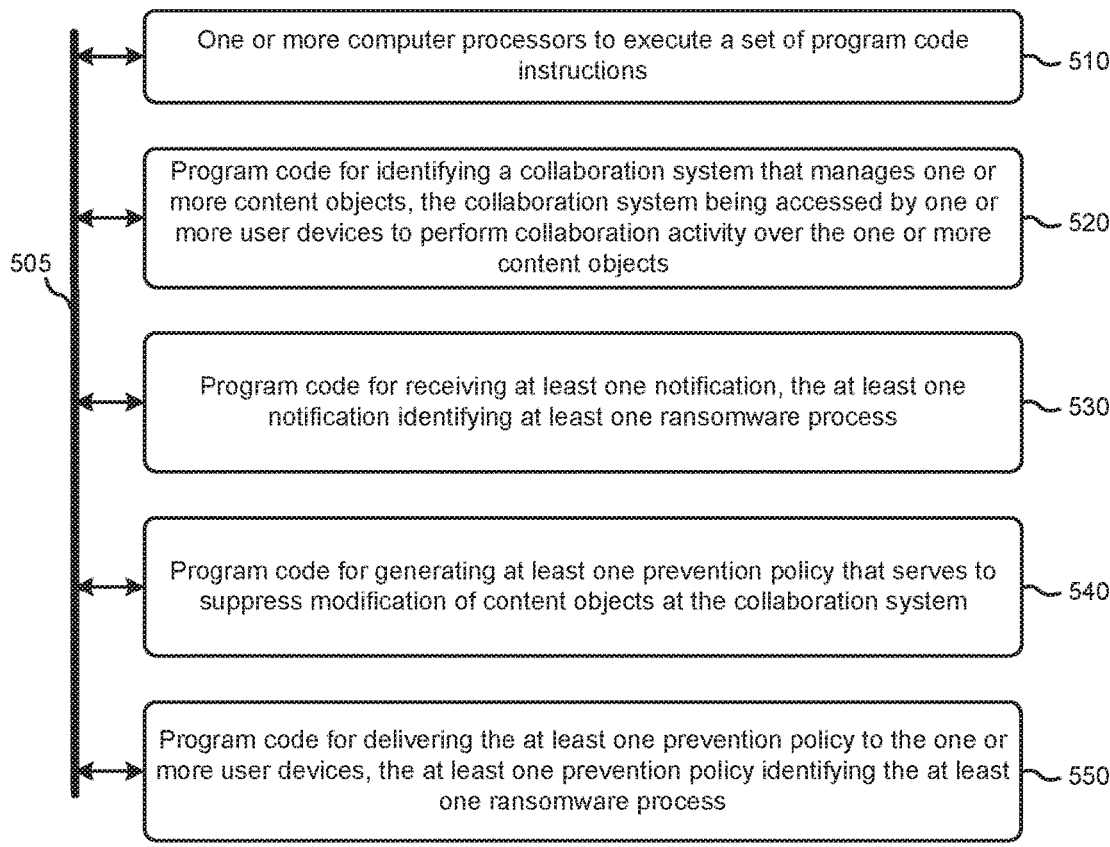
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. This and other embodiments present particular arrangements of elements that, individually or as combined, serve to form improved technological processes that address avoiding propagation of deleterious ransomware effects in collaboration environments. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment.

The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with any other operations over communication path 505. The modules of the system can, individually or in combination, perform method operations within system 500. Any operations performed within system 500 may be performed in any order unless as may be specified in the claims.

The shown embodiment implements a portion of a computer system, presented as system 500, comprising one or more computer processors to execute a set of program code instructions (module 510) and modules for accessing memory to hold program code instructions to perform: identifying a collaboration system that manages one or more content objects, the collaboration system being accessed by one or more user devices to perform collaboration activity over the one or more content objects (module 520); receiving at least one notification, the at least one notification identifying at least one ransomware process (module 530); generating at least one prevention policy that serves to suppress modification of content objects at the collaboration system (module 540); and delivering the at least one prevention policy to the one or more user devices, the at least one prevention policy identifying the at least one ransomware process (module 550).

Variations of the foregoing may include more or fewer of the shown modules. Strictly as examples, the system may initiate and/or perform further operations comprising (1) processing prevention policies to block invocation of ransomware processes, and/or (2) suspending collaboration activity over content objects, and/or (3) sending indications that collaboration activity may be resumed (e.g., after ransomware remediation), and/or (4) initiating or performing other operations by and between the user devices and components of the collaboration system.

Certain variations may perform more or fewer (or different) steps and/or certain variations may use data elements in more or in fewer or in different operations. Still further, some embodiments include variations in the operations performed, and some embodiments include variations of aspects of the data elements used in the operations.

Additional System Architecture Examples

Figure 6A:
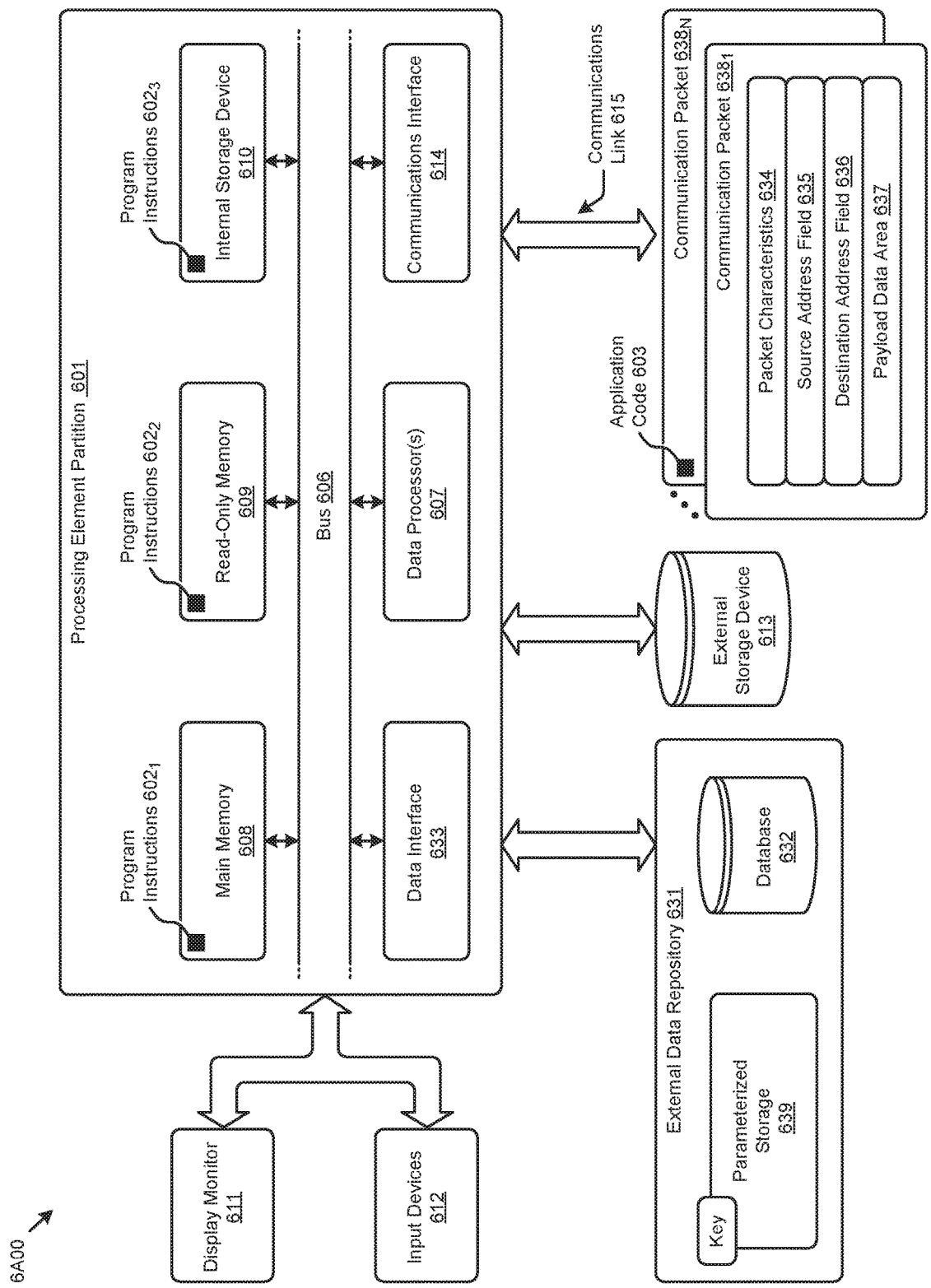
FIG. 6A and FIG. 6B present block diagrams of computer system architectures having components suitable for implementing embodiments of the present disclosure, and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. Computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of communications interface 614 may comprise one or more networking ports that are configurable (e.g., pertaining to speed, protocol, physical layer characteristics, media access characteristics, etc.) and any particular instance of communications interface 614 or port thereto can be configured differently from any other particular instance. Portions of a communication protocol can be carried out in whole or in part by any instance of communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

Communications link 615 can be configured to transmit (e.g., send, receive, signal, etc.) any types of communications packets (e.g., communication packet $638_1$, communication packet $638_N$) comprising any organization of data items. The data items can comprise a payload data area 637, a destination address 636 (e.g., a destination IP address), a source address 635 (e.g., a source IP address), and can include various encodings or formatting of bit fields to populate packet characteristics 634. In some cases, the packet characteristics include a version identifier, a packet or payload length, a traffic class, a flow label, etc. In some cases, payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of a computer system 6A00. According to certain embodiments of the disclosure, two or more instances of computer system 6A00 coupled by a communications link 615 (e.g., LAN, public switched telephone network, or wireless network) may perform the sequence of instructions required to practice embodiments of the disclosure using two or more instances of components of computer system 6A00.

Computer system 6A00 may transmit and receive messages such as data and/or instructions organized into a data structure (e.g., communications packets). The data structure can include program instructions (e.g., application code 603), communicated through communications link 615 and communications interface 614. Received program code may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

Processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to remediation of ransomware effects across networks of devices in a collaboration environment. A module may include one or more state machines and/or combinational logic used to implement or facilitate the operational and/or performance characteristics pertaining to remediation of ransomware effects across networks of devices in a collaboration environment.

Various implementations of database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of remediation of ransomware effects across networks of devices in a collaboration environment). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to remediation of ransomware effects across networks of devices in a collaboration environment, and/or for improving the way data is manipulated when performing computerized operations for dynamically generating and broadcasting prevention policies that identify and block ransomware propagation in a collaboration environment.

Figure 6B:
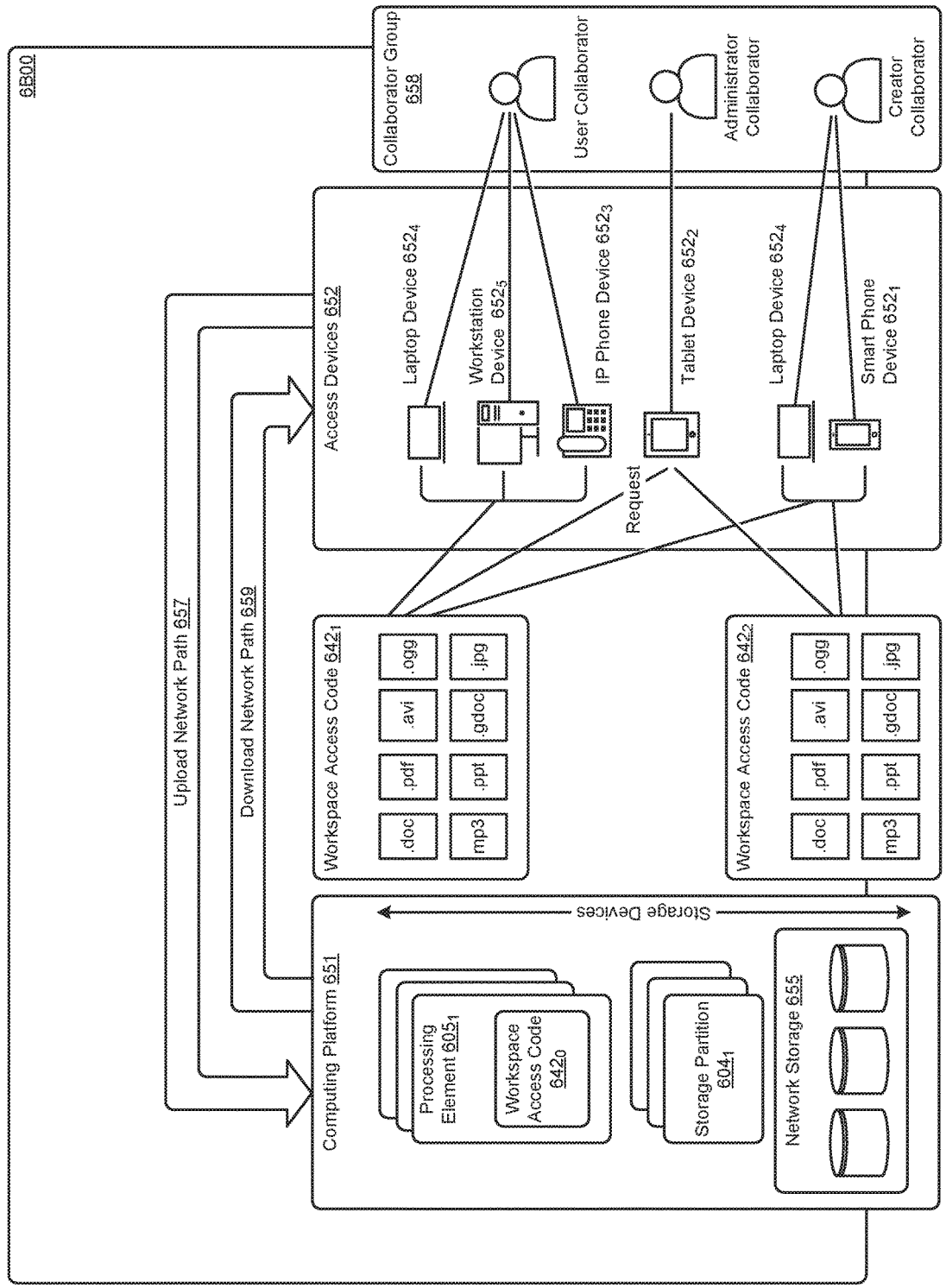

FIG. 6B depicts a block diagram of an instance of a cloud-based environment 6B00. Such a cloud-based environment supports access to workspaces through the execution of workspace access code (e.g., workspace access code $642_0$, workspace access code $642_1$, and workspace access code $642_2$). Workspace access code can be executed on any of access devices 652 (e.g., laptop device $652_4$, workstation device $652_5$, IP phone device $652_3$, tablet device $652_2$, smart phone device $652_1$, etc.), and can be configured to access any type of object. Strictly as examples, such objects can be folders or directories or can be files of any filetype. A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element $605_1$). The workspace access code can interface with storage devices such as networked storage 655. Storage of workspaces and/or any constituent files or objects, and/or any other code or scripts or data can be stored in any one or more storage partitions (e.g., storage partition $604_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for ransomware remediation in collaboration environments, the method comprising:
   maintaining a collaboration system having a content object shared and collaborated on by a plurality of user devices, wherein
      at least one local copy of the content object from a collaboration system is stored in a file system of the plurality of user devices, and
      the collaboration system is accessed by one or more instances of a collaboration application respectively invoked by the plurality of user devices to collaborate on the content object by performing file operations over the content object;
   receiving, at the collaboration system from a first instance of the collaboration application invoked by a first user device of a first user from among the plurality of user devices that perform the file operations, a notification that describes a change in the at least one local copy of the content object caused by a ransomware process running on the first user device or an effect of the ransomware process running on the first user device;
   on the first user device, suspending first collaboration activities for collaborating on the content object and preventing synchronization of a first update of the at least one local copy of the content object to the collaboration system;
   identifying, on the collaboration system, at least one second user device of a second user from the plurality of user devices based at least in part upon object metadata pertaining to the content object, wherein
      the object metadata of the content object includes information indicative of collaboration activities on the content object by at least some of the plurality of user devices, and
      the collaboration system determines that the at least one second user device may have performed a collaboration activity on the content object, based at least in part upon the object metadata in a manner that may cause propagation of the ransomware process;
   suspending, on the collaboration system, system collaboration activities for the content object and a list of one or more content objects that is deemed to be affected by the ransomware process;
   generating, by the collaboration system, a prevention policy based at least in part on the notification received from the first user device, wherein the prevention policy is different from one or more existing prevention policies already stored on the plurality of user devices;
   delivering, from the collaboration system to the at least one second user device, a prevention message that comprises the prevention policy and information pertaining to at least the ransomware process, wherein
      the prevention policy is generated to comprise first information pertaining to the list of one or more content objects that is deemed to be affected by the ransomware process and the prevention policy that defines one or more processes or actions for blocking the ransomware process,
      in addition to the first user device, at least a portion of the prevention message is further delivered to the at least one second user device identified based at least in part on a set of data records representing relationships between at least some of the plurality of users or between the at least some of the plurality of users and the content object, and the at least one second user device at least potentially has access, via a second instance of the collaboration application on the at least one second user device, to the content object affected by the ransomware process running on the first user device;

preventing synchronization of an update to the at least one second user device of the content object and the list of one or more content objects; and suspending, on the at least one second user device, second collaboration activities performed by the at least one second user device on a local copy of the content object on the at least one second user device based at least in part upon the prevention message or the prevention policy in the prevention policy, wherein the second collaboration activities comprise editing the local copy of the content object on the at least one second user device.

2. The method of claim 1, further comprising:
identifying, on the collaboration system, an additional content object on which the at least one second user device and the first user device have collaborated on;

suspending, on the at least one second user device, the second collaboration activities for collaborating on a local copy of the additional content object and the local copy of the content object on the at least one second user device based at least in part upon the prevention policy or the prevention message; and preventing the synchronization of respective updates for the local copy of the additional content object and the local copy of the content object to one or more other server-resident instances of the content object and the additional content object.

3. The method of claim 2, further comprising blocking an invocation of the ransomware process at the collaboration system, wherein the prevention policy comprises third information pertaining to the list of one or more content objects deemed to be affected by the ransomware process.

4. The method of claim 1, further comprising:
processing the prevention message to block invocation of the ransomware process at the at least one second user device; and blocking one or more first operations on the at least one local copy of the content object on the plurality of user devices, or blocking one or more second operations to a native file system of the one or more user devices.

5. The method of claim 1, further comprising:
suspending at least a portion of the file operations performed over the content object, wherein the prevention policy comprises fourth information pertaining to one or more processes or actions for suspending at least the portion of the file operations performed over the content object, wherein the one or more processes or actions comprise a process to be suspended or disabled; and blocking one or more operations that are able to be invoked by the ransomware process.

6. The method of claim 5, further comprising:
resuming at least some of the at least the portion of file operations, wherein the prevention policy identifies the ransomware process and is processed by the second instance of the collaboration application on the at least one second user device to block the ransomware process.

7. The method of claim 6, wherein the at least some of the at least the portion of the file operations is resumed based at least in part on a ransomware remediation status.

8. The method of claim 1, further comprising:
detecting the ransomware process or the effect of the ransomware process running on the first user device; and issuing, in response to detecting the ransomware process, a separate notification for suspending or backing out a collaboration activity over the content object affected by the ransomware process and a separate content object of the plurality of content objects, wherein the separate notification comprises a process hash pertaining to the ransomware process.

9. The method of claim 8, wherein
the detecting the ransomware process is based at least in part on at least one of an activity pattern, or a content object entropy parameter, or a content object file extension, and the ransomware process detected comprises a sequence of open-edit-close file operations within a period of time over the plurality of content objects shared in the collaboration system.

10. The method of claim 1, wherein
the notification comprises at least one of a notification identifier, a device identifier, a user identifier, a ransomware detection class, an object identifier, or a process hash, and the ransomware process comprises reading an existing instance of the content object, opening a new instance of the content object, and writing encrypted content to the new instance of the content object.

11. The method of claim 1, wherein
the change in the content object made by the ransomware process comprises at least one of random data, or executable code comprising ransomware, or a variation or portion of the executable code that is embedded in the content object, the prevention policy comprises a process hash associated with the ransomware process and is one of a plurality of policy types, and the plurality of policy types comprises a specific policy type one or more actions for execution upon detection of a specific ransomware process and an agnostic policy type that defines one or more actions for execution upon detection of a plurality of different types of ransomware processes.

12. A non-transitory computer readable medium having stored thereon a sequence of instructions which, when stored in memory and executed by one or more processors causes the one or more processors to perform a set of acts for ransomware remediation in collaboration environments, the set of acts comprising:

maintaining a collaboration system having a content object shared and collaborated on by a plurality of user devices, wherein at least one local copy of the content object from a collaboration system is stored in a file system of the plurality of user devices, and the collaboration system is accessed by one or more instances of a collaboration application respectively invoked by the plurality of user devices to collaborate on the content object by performing file operations over the content object;

receiving, at the collaboration system from a first instance of the collaboration application invoked by a first user device of a first user from among the plurality of user devices that perform the file operations, a notification that describes a change in the at least one local copy of the content object caused by a ransomware process running on the first user device or an effect of the ransomware process running on the first user device;

on the first user device, suspending first collaboration activities for collaborating on the content object and preventing synchronization of a first update of the at least one local copy of the content object to the collaboration system;

identifying, on the collaboration system, at least one second user device of a second user from the plurality of user devices based at least in part upon object metadata pertaining to the content object, wherein
   the object metadata of the content object includes information indicative of collaboration activities on the content object by at least some of the plurality of user devices, and
   the collaboration system determines that the at least one second user device may have performed a collaboration activity on the content object, based at least in part upon the object metadata in a manner that may cause propagation of the ransomware process;

suspending, on the collaboration system, system collaboration activities for the content object and a list of one or more content objects that is deemed to be affected by the ransomware process;

generating, by the collaboration system, a prevention policy based at least in part on the notification received from the first user device, wherein the prevention policy is different from one or more existing prevention policies already stored on the plurality of user devices;

delivering, from the collaboration system to the at least one second user device, a prevention message that comprises the prevention policy and information pertaining to at least the ransomware software, wherein
   the prevention policy is generated to comprise first information pertaining to the list of one or more content objects that is deemed to be affected by the ransomware process and the prevention policy that defines one or more processes or actions for blocking the ransomware process,
   in addition to the first user device, at least a portion of the prevention message is further delivered to the at least one second user device identified based at least in part on a set of data records representing relationships between at least some of the plurality of users or between the at least some of the plurality of users and the content object,
   the at least one second user device at least potentially has access, via a second instance of the collaboration application on the at least one second user device, to the content object affected by the ransomware process running on the first user device;

preventing synchronization of an update to the at least one second user device of the content object and the list of one or more content objects; and suspending, on the at least one second user device, second collaboration activities performed by the at least one second user device on a local copy of the content object on the at least one second user device based at least in part upon the prevention message or the prevention policy in the prevention policy, wherein the second collaboration activities comprise editing the local copy of the content object on the at least one second user device.

13. The non-transitory computer readable medium of claim 12, further comprising instructions which, when stored in memory and executed by the one or more processors causes the one or more processors to perform acts of:
   identifying, on the collaboration system, an additional content object on which the at least one second user device and the first user device have collaborated on;
   suspending, on the at least one second user device, the second collaboration activities for collaborating on a local copy of the additional content object and the local copy of the content object on the at least one second user device based at least in part upon the prevention policy or the prevention message; and
   preventing the synchronization of respective updates for the local copy of the additional content object and the local copy of the content object to one or more other server-resident instances of the content object and the additional content object.

14. The non-transitory computer readable medium of claim 13, further comprising instructions which, when stored in memory and executed by the one or more processors causes the one or more processors to perform acts of blocking an invocation of the ransomware process at the collaboration system, wherein the prevention policy comprises third information pertaining to a list of one or more content objects deemed to be affected by the ransomware process.

15. The non-transitory computer readable medium of claim 12, further comprising instructions which, when stored in memory and executed by the one or more processors causes the one or more processors to perform acts of processing the prevention message to block invocation of the ransomware process at the at least one second user device; and blocking one or more first operations on the at least one local copy of the content object of the plurality of user devices, or blocking one or more second operations to a native file system of the one or more user devices.

16. The non-transitory computer readable medium of claim 12, further comprising instructions which, when stored in memory and executed by the one or more processors causes the one or more processors to perform acts of:
   suspending at least a portion of the file operations performed over the content object, wherein the prevention policy comprises fourth information pertaining to one or more processes or actions for suspending at least the portion of the file operations performed over the content object, wherein the one or more processes or actions comprise a process to be suspended or disabled; and
   blocking one or more operations that are able to be invoked by the ransomware process.

17. The non-transitory computer readable medium of claim 16, further comprising instructions which, when stored in memory and executed by the one or more processors cause the one or more processors to perform acts of:
   resuming at least some of the at least the portion of file operations, wherein the prevention policy identifies the ransomware process and is processed by the second instance of the collaboration application on the at least one second user device to block the ransomware process.

18. The non-transitory computer readable medium of claim 17, wherein the at least some of the at least the portion of the file operations is resumed based at least in part on a ransomware remediation status.

19. A system for ransomware remediation in collaboration environments, the system comprising:
   a non-transitory storage medium having stored thereon a set of instructions; and
   one or more processors that execute the set of instructions, wherein execution of the set of instructions causes the one or more processors to perform a set of acts, the set of acts comprising:
   maintaining a collaboration system having a content object that is shared and collaborated on by a plurality of user devices, wherein
      at least one local copy of the content object from a collaboration system is stored in a file system of the plurality of user devices, and
      the collaboration system is accessed by one or more instances of a collaboration application invoked by the plurality of user devices to collaborate on the content object by performing file operations over the content object;
   receiving, at the collaboration system from a first instance of the collaboration application invoked by a first user device of a first user from among the plurality of user devices that perform the file operations, a notification that describes a change in the at least one local copy of the content object caused by a ransomware process running on the first user device or an effect of the ransomware process running on the first user device;
   on the first user device, suspending first collaboration activities for collaborating on the content object and preventing synchronization of a first update of the at least one local copy of the content object to the collaboration system;
   identifying, on the collaboration system, at least one second user device of a second user from the plurality of user devices based at least in part upon object metadata pertaining to the content object, wherein
      the object metadata of the content object includes information indicative of collaboration activities on the content object by at least some of the plurality of user devices, and
      the collaboration system determines that the at least one second user device may have performed a collaboration activity on the content object, based at least in part upon the object metadata in a manner that may cause propagation of the ransomware process;
   suspending, on the collaboration system, system collaboration activities for the content object and a list of one or more content objects that is deemed to be affected by the ransomware process;
   generating, by the collaboration system, a prevention policy based at least in part on the notification received from the first user device, wherein the prevention policy is different from one or more existing prevention policies already stored on the plurality of user devices;
   delivering, from the collaboration system to the at least one second user device, a prevention message that comprises the prevention policy and information pertaining to at least the ransomware process, wherein
      the prevention policy is generated to comprise first information pertaining to the list of one or more content objects that is deemed to be affected by the ransomware process and the prevention policy that defines one or more processes or actions for blocking the ransomware process,
      in addition to the first user device, at least a portion of the prevention message is further delivered to the at least one second user device identified based at least in part on a set of data records representing relationships between at least some of the plurality of users or between the at least some of the plurality of users and the content object,
      the at least one second user device at least potentially has access, via a second instance of the collaboration application on the at least one second user device, to the content object affected by the ransomware process running on the first user device;
   preventing synchronization of an update to the at least one second user device of the content object and the list of one or more content objects; and
   suspending, on the at least one second user device, second collaboration activities performed by the at least one second user device on a local copy of the content object on the at least one second user device based at least in part upon the prevention message or the prevention policy in the prevention policy, wherein the second collaboration activities comprise editing the local copy of the content object on the at least one second user device.

20. The system of claim 19, wherein
   the change in the content object made by the ransomware process comprise at least one of random data, or executable code comprising ransomware, or a variation or portion of the executable code that is embedded in the content object,
   the prevention policy comprises a process hash associated with the ransomware process and is one of a plurality of policy types, and
   the plurality of policy types comprises a specific policy type one or more actions for execution upon detection of a specific ransomware process and an agnostic policy type that defines one or more actions for execution upon detection of a plurality of different types of ransomware processes.

* * * * *